July 10, 1962  L. W. ERATH ETAL  3,044,042
APPARATUS FOR GENERATING AND EMPLOYING TIME PULSES
Filed April 6, 1956  3 Sheets-Sheet 1

DECADE SCALER

Louis W. Erath
Paul E. Madeley
Friedrich W. Hefer
INVENTORS

BY Thomas O. Arnold
ATTORNEY

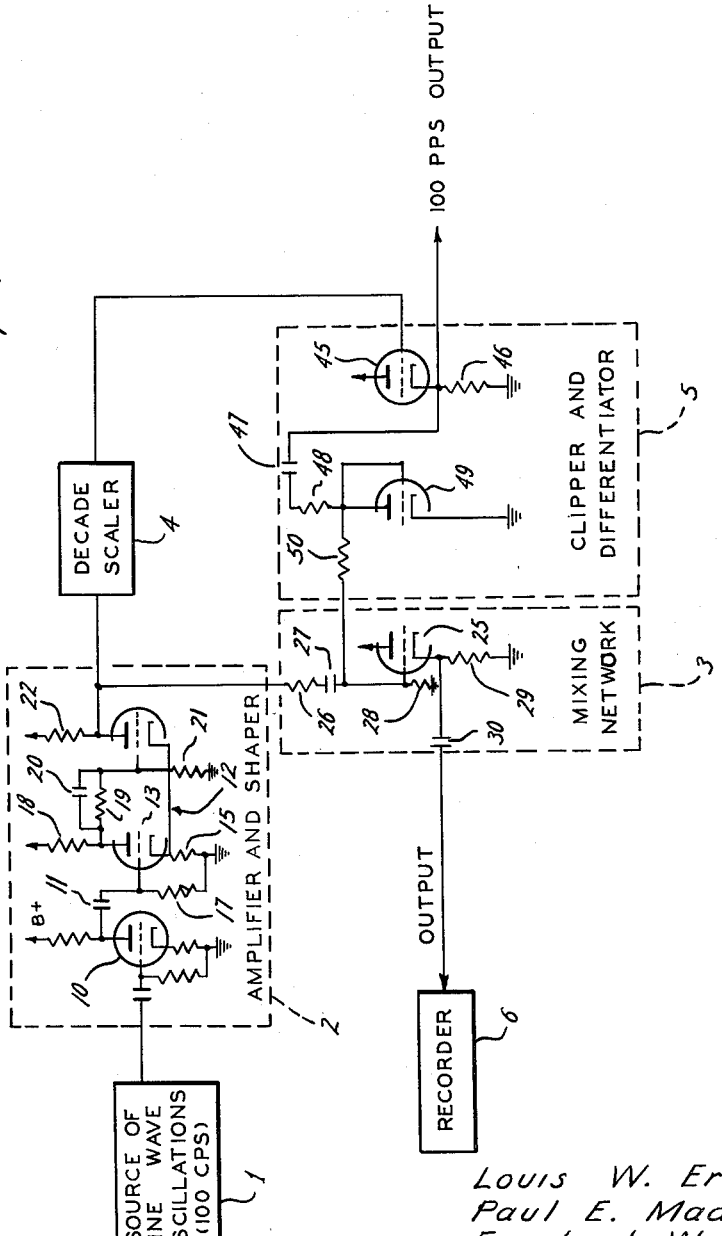

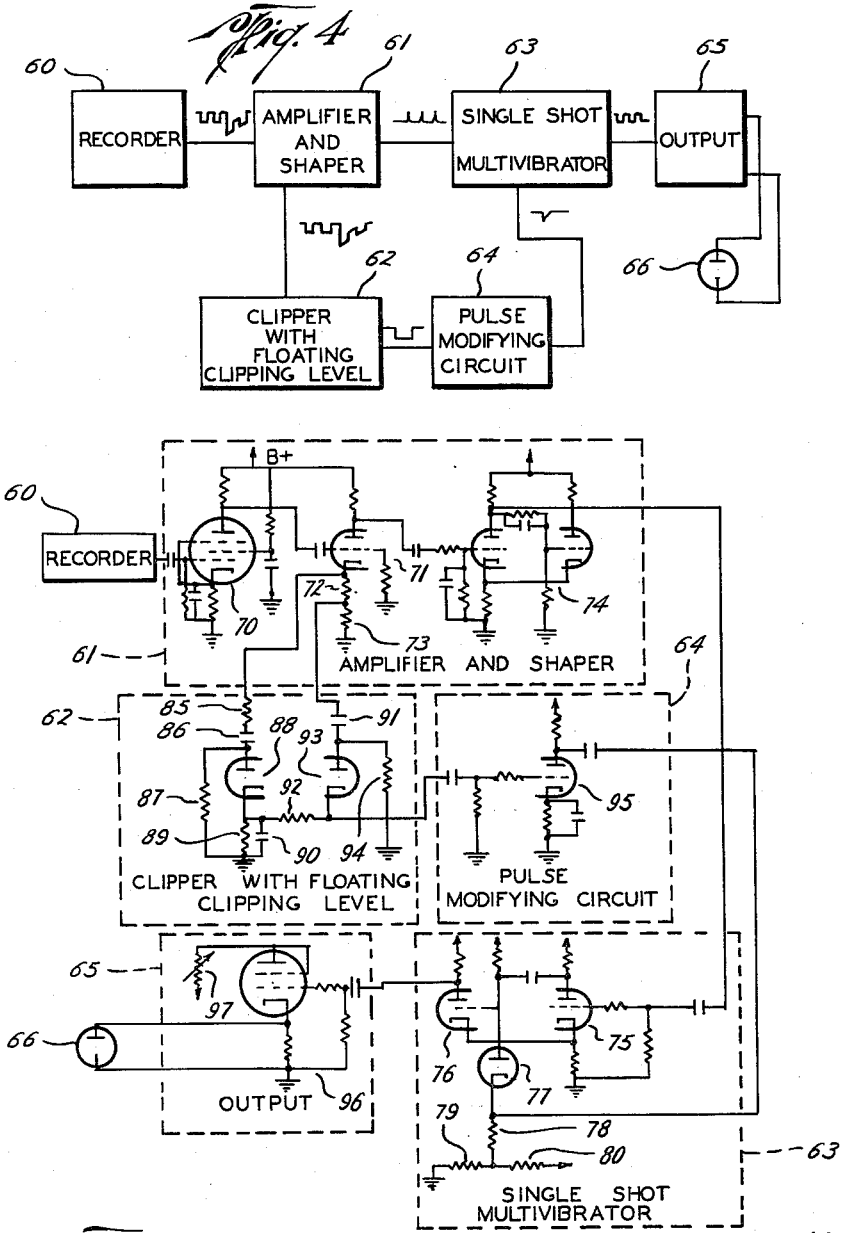

United States Patent Office 3,044,042
Patented July 10, 1962

3,044,042
APPARATUS FOR GENERATING AND EMPLOY-
ING TIME PULSES
Louis W. Erath, Paul E. Madeley, and Friedrich W.
Hefer, Harris County, Tex., assignors, by mesne assign-
ments, to Dresser Industries, Inc., Dallas, Tex., a cor-
poration of Delaware
Filed Apr. 6, 1956, Ser. No. 576,652
4 Claims. (Cl. 340—15.5)

This invention relates to generating a time signal, and, more particularly, to a method and apparatus for generating a time signal of pulses of voltage adapted to be recorded with another signal and having every $n$th pulse distinguished from the remaining pulses.

In recording observed or detected information, such as the output of a geophone in seismic prospecting, it is frequently necessary that a time signal be recorded with the information, so that the time of observation may be readily determined. It is further desirable that the time signal be recorded in such a fashion that the time intervals between fairly well-spaced items of information may be identified readily. Where the time signal identifies every hundredth of a second, for instance, it is advantageous to distinguish every tenth of a second interval, so that the time interval between items spaced on the order of several tenths of a second may be more quickly identified. The method and apparatus of this invention is designed to supply a signal for identifying such time intervals.

While the method and apparatus of the invention is not restricted for use with geophysical records, it is particularly adapted thereto.

In the past, time signals have been put on geophysical records by light valves controlled by synchronous motors or tuning forks, and designed to expose photographic paper advancing past the light valve along narrow strips periodically, or by generating a periodic wave and recording the wave. Unfortunately these prior art time signal systems have substantial inertia and are unable to follow short-time variations in speed of the record advance, so that the time signal is recorded improperly. Moreover, the prior art systems are not readily controllable to adjust the position of the timing signal, and their components are relatively bulky, so as to make it difficult to record timing signals in the field with geophone outputs.

The method and apparatus of the present invention operates electronically to follow with exactitude transient variations in record advance, is compact so as to facilitate easy field recording, and is easily adjusted. Moreover, the invention provides pulses of voltage adapted to record narrow timing lines, with broader lines for every $n$th pulse.

The apparatus of the invention includes means for generating a train of pulses of voltage spaced equally in time, and means for distinguishing every $n$th one of said pulses by changing a parameter thereof, the train of pulses as so changed being adapted to be recorded on, for instance, a magnetic tape, with a geophone signal, or to control a source of light to expose a photographic web also exposed to geophone signals.

The invention will now be described more particularly in conjunction with preferred embodiment of the invention as shown in the accompanying drawings.

In the drawings:

FIG. 2 is a schematic diagram of the apparatus of FIG. 1;

FIG. 4 is a block diagram of a second form of the invention, designed to translate a train of the type supplied by the apparatus of FIG. 1 into a train having every $n$th pulse of different width than the others; and, FIG. 5 is a schematic diagram of the apparatus of FIG. 4.

Figure 1:
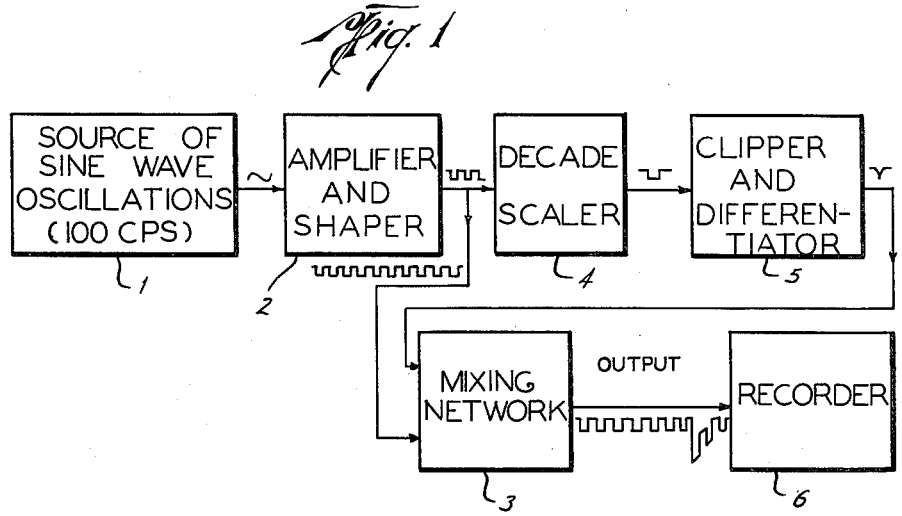
FIG. 1 is a block diagram of a first form of the invention, designed to supply a train of pulses having every $n$th pulse of different amplitude than the others.

Referring first to FIG. 1, the apparatus shown therein is designed to supply a train of pulses having every tenth pulse of different amplitude than the others. The apparatus includes a source 1 of sine wave oscillators which may be, for example, of 100 c.p.s. frequency. The wave shape of the oscillations is changed and the oscillations amplified in an amplifier and shaper 2, which supplies an output of voltage pulses equally spaced in time. One portion of the output of the amplifier and shaper is supplied directly to a mixing network 3, while another portion is supplied to a decade scaler 4. The decade scaler provides an output consisting of one pulse for every $n$ pulses of the wave train supplied it, with said one pulse coinciding with $n$th pulse, the number $n$ here being 10.

The output of the decade scaler is supplied to a clipping and differentiating circuit 5, which transforms the rectangular pulse output of the scaler into spiked pulses coincident therewith. The pulse output of the clipping and differentiating circuit is also supplied to mixing network 3.

The mixing network combines the wave of every 10th pulse with the train of 100 p.p.s. pulses to produce the output shown. The output may be used for any purpose employing a time signal, including recording. For the latter use, the output of the mixing network may be supplied to a recorder 6, which may include a magnetic head to record on magnetic tape for field geophysical recording, and which then would also be supplied with the output of a geophone.

Referring next to FIG. 2 for the circuitry of some of the elements of FIG. 1, the amplifier and shaper 2 includes a triode amplifier tube 10 having the usual grid-cathode and plate-cathode circuits, with the amplified sine wave output supplied through a capacitor 11 to a Schmitt trigger circuit 12, which acts to shape the positive half cycles of the sine wave into rectangular pulses of voltage. The Schmitt circuit includes a pair of triodes 13 and 14 having their cathodes connected together, with a common cathode resistor 15 to ground. As shown, the triodes may be contained in the same envelope. Static grid bias for tube 13 is set by a voltage divider including resistors 16 and 17 connected between B+ (not shown) and ground. The resistors are so selected that tube 13 is biased beyond cutoff.

The plate of tube 13 is connected to B+ through a resistor 18, and the voltage across the resistor is coupled to the grid of triode 14 through an R-C shunt combination of resistor 19 and capacitor 20. The usual grid resistor 21 completes the grid-cathode circuit of tube 14.

Tube 14 is biased above cutoff, so that plate current normally flows therethrough and is terminated only by a negative pulse to its grid caused by conduction of tube 13 in response to arrival at the grid of that tube of a positive half cycle of sine wave voltage. The 100 p.p.s. rectangular output pulses of tube 14 are developed across a plate resistor 22 connected to B+, and the output pulses are supplied in multiple to decade scaler 4 and mixing network 3.

The mixing network 3 includes a cathode-coupled stage having a triode 25 with its grid supplied with 100 p.p.s. signal through an R-C series combination including resistor 26 and capacitor 27. A grid resistor 28 and cathode resistor 29 complete the grid-cathode circuit of the tube. The output of the mixer is supplied from resistor 29 through a capacitor 30 to recorder 6, so that the recorder would receive a simple 100 p.p.s. train of pulses, all of equal amplitude and duration, if it were not for the decade scaler 4 and the clipping and differentiating circuit 5.

Figure 3:
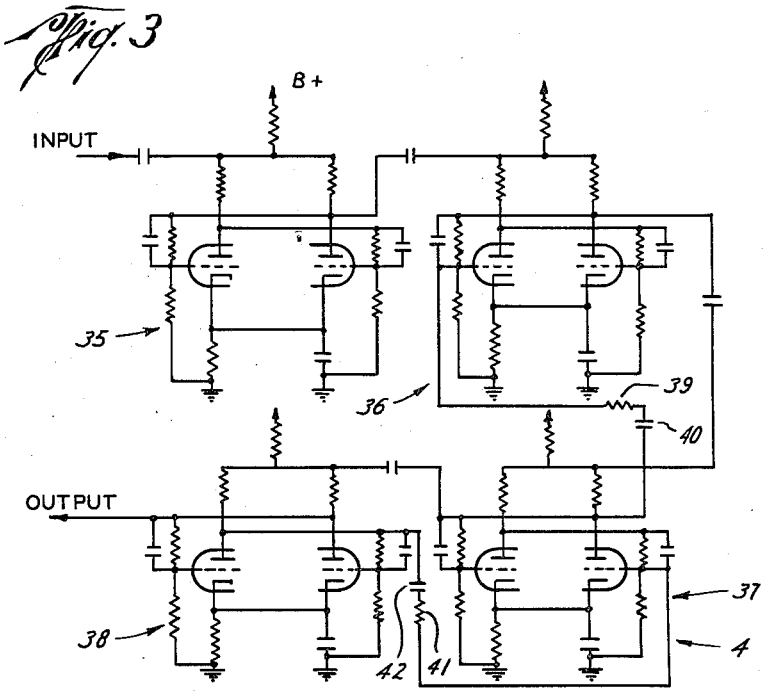
FIG. 3 is a schematic diagram of a decade scaler of the type used in FIG. 1.

Referring now to FIG. 3, the decade scaler is of conventional design and may be of any type available on the market, such as that shown including four cathode-coupled flip-flops 35–38. Coupling between the grid of the first tube of the second flip-flop 36 and the plate of the first tube of the second flip-flop 37 is achieved through the series combination of resistor 39 and capacitor 40, while coupling between the grid of the first tube of the third flip-flop 37 and the plate of the first tube of flip-flop 38 is achieved through the series combination of resistor 41 and capacitor 42.

As noted above, the design of decade scaler 4 is conventional and well-known, so that its circuitry need not be more fully described. Suffice it to say that the output of the scaler consists of a wave of equally time-spaced rectangular pulses of voltage having a frequency $1/n$ the frequency of the input, or a pulse output consisting of one pulse for every $n$th of the input, with $n=10$ and with the output pulse coinciding with the tenth input pulse. The scaler and the trigger circuit of amplifier and shaper 2 are so designed that the pulses from the scaler may have the same duration as those from the trigger circuit.

Referring back to FIG. 2, the output of scaler 4, consisting of rectangular pulses of voltage, is supplied to the grid of a cathode-coupled stage including triode 45 and cathode resistor 64. Across resistor 46, therefore, a wave of 10 p.p.s. rectangular pulses of voltage is developed, and that wave may be used for any appropriate purpose, such as firing the shot for the geophysical reading.

The clipper and differentiator 5 further includes a series R-C differentiating circuit including capacitor 47 and resistor 48, connected in series with a triode 49, connected as a diode, across cathode resistor 46. The output of this circuit is connected across grid resistor 28 of the mixer tube through a resistor 50. The diode 49 acts to clip off all positive pulses of the 10 p.p.s. wave, and the combination of capacitor 47 and resistors 48, 50, and 28 acts as a differentiating circuit to translate the rectangular negative pulses of the 10 p.p.s. wave into negative spiked pulses. Consequently, every time one of the 10 p.p.s. pulses arrives at the mixer (coincident with every 10th pulse of the train from the amplifier and shaper), the grid of mixer tube 25 is driven much more negative than normal, and the recorder receives a negative pulse of much greater amplitude than that of the other pulses. Hence, the recorder is able to distinguish between the amplitude differences of the 100 p.p.s. pulses and every tenth one of them.

It will be obvious that it is not necessary that every 10th pulse be so distinguished since $n$ could be selected to be a larger or a smaller number.

As indicated above, the recorder 6 may be of the magnetic type and may also record the output of a geophone. As a matter of fact the outputs of several geophones spaced differently from the shot may be recorded on the same tape with a single time signal of the type obtained with the above-described circuits and method.

A time signal with amplitude differentiation of every $n$th pulse is advantageous for temporary magnetic recording with geophone outputs in the field, but such recordings are preferably translated into optical representation for consideration or analysis. Such representation may be on photographic paper advanced past a light source controlled by the signals recorded from the geophone and the time signal in the field. The recorded time signal obtained with the method and apparatus above described would then appear as spaced lines extending across the direction of movement of the photographic paper or web. For such use, amplitude distinction between every $n$th pulse and the remaining pulses, though usable, would not be completely satisfactory. The method and apparatus now to be described has been designed to translate the amplitude distinction of the time signal into a pulse width distinction, to provide a wider line on the photographic paper for every $n$th pulse of the signal, a more satisfactory method of differentiation for photographic representation.

Referring to FIG. 4, a recorder 60 similar to recorder 6 of FIG. 1 is used to play back the recorded time signal with amplitude differentiation of every $n$th pulse, as shown in FIG. 4. The detected signal is supplied to two section amplifier and shaper 61. The amplifier supplies its output in multiple to the shaper section and to the clipper 62. The shaper forms the rectangular pulses of the time signal into positive spike-shaped pulses suitable to drive the single shot multivibrator 63. The multivibrator is of conventional design and supplies an output of rectangular pulses of frequency corresponding to that of the train of pulses received from the recorder. However, all the pulses of the multivibrator output would be identical except for the clipper 62 and a pulse modifying circuit 64, which selects every $n$th pulse of the train from the recorder and changes that pulse into a negative spike-shaped pulse for controlling the multivibrator. The spike pulse from the pulse modifying circuit increases the width of every $n$th pulse of the multivibrator, so that the multivibrator output is identical with the recorded time signal, except that every $n$th pulse is of different width or duration, than the others.

The output of the multivibrator 63 controls an output stage 65 which may control illumination of a glow modulator tube 66, of conventional design, and the glow modulator tube may expose a photographic paper moving past it to record timing lines thereon, with every $n$th pulse of greater width than the others.

Most of the elements of the system of FIG. 4 are shown in more detail in FIG. 5. The recorder 60, being of conventional design, is not shown in detail. However, it may include a magnetic pickup head to translate a record made on magnetic tape by the apparatus of FIGS. 1–3 into a voltage time signal. The output of the recorder is supplied to a vacum tube amplifier 70 of conventional design. The amplifier output is supplied to a stage including triode 71 having a pair of cathode resistors 72 and 73 connected in series between the cathode and ground. The output of triode 71 is taken both from its plate and its cathode resistors, with the plate output being capacitively coupled to Schmitt trigger circuit 74 used as a shaper to change the rectangular pulse output of triode 71 into spike-shaped pulses. Since the Schmitt circuit has already been described in connection with the shaper 12 of FIG. 2, it will not be further described. The cathode-coupled output of the amplifier is supplied to clipper 62.

The multivibrator is generally of conventional design including two triode tubes 75 and 76, with the amplified and shaped pulse train supplied to the grid-cathode circuit of tube 75. However, the grid-cathode circuit of tube 76 includes the series combination of a diode rectifier 77 and resistor 78 connected to a voltage divider including resistors 79 and 80 between ground and B+. The bias of this circuit controls the length of conduction of tube 76 following each pulse supplied by the shaper to the grid circuit of tube 75.

The output of amplifier 71 supplied across its cathode resistors is clipped to select every $n$th one of its pulses according to their distinction in parameter between the others. In the system disclosed in FIG. 5, every tenth pulse of the timing signal is of greater amplitude than the others. These 10th pulses are extracted from the pulse train by a clipper 62 having a floating clipping level.

The clipper circuit includes a series circuit connected across cathode resistors 72 and 73, this circuit consisting of a resistor 85, a capacitor 86, and a resistor 87 connected across the series combination of a diode rectifier 88 and an R-C bias circuit including resistor 89 and capacitor 90.

Connected between the high side of cathode resistor 73 and this bias circuit is the series combination of a capacitor 91, a diode rectifier 93 and a resistor 92. A resistor 94 is connected between the junction of capacitor 91 and diode 93 and ground.

The output of the clipper 62 is supplied from across the series combination of resistor 92 and the shunt-connected resistor 89 and capacitor 90 to the pulse modifying circuit 64.

The clipper above described establishes for itself a bias or clipping level determined by the average peak amplitude of the pulses supplied it and clips off all pulses having an amplitude not greater than this clipping level, so that only pulses of greater amplitude reach the pulse modifier. Since the average peak amplitude of the pulses of the train supplied the clipper by stage 71 is substantially the amplitude of all pulses but the $n$th pulses, only the $n$th pulses reach the pulse modifying circuit.

Pulse modifying circuit 64 includes a triode tube 95 so biased by a conventional grid-cathode circuit that it emits a negative spike-shaped pulse for each pulse reaching it from the clipper. The output of tube 95 is taken from across its plate resistor and applied across the series combination of resistors 78 and 79 of the multivibrator circuit. Consequently, as every 10th pulse reaches the grid circuit of tube 75 of the multivibrator, a pulse from tube 95 of the modifying circuit drives the grid of tube 76 more negative, to change the time of conduction thereof. The output from the multivibrator is supplied to the grid-cathode circuit of a power amplifier stage 96 forming the output 65. The output of this stage is connected across glow modulator tube 66, which may be used as above described. The plate resistor 97 of output stage 96 is preferably variable to allow control of the amount of illumination furnished by glow tube 66.

We have described systems and methods for generating a train of voltage pulses having every $n$th pulse different in parameter than the others, and a system for changing a train of pulses using amplitude differentiation to distinguish every $n$th pulse. The two systems and methods may be used separately or may be combined together, particularly for temporarily recording a time signal with a geophone output conveniently in the field, and later for translating the temporary recording into a more permanent one.

It will be obvious that many changes could be made in the methods and apparatus disclosed without departure from the scope of the invention. Accordingly, the invention is not to be considered limited to preferred embodiments disclosed but only by the scope of the appended claims.

We claim:

1. Apparatus for generating a timing sequence of pulses having every $n$th pulse distinguished from the remaining pulses comprising a source of a train of equally time-spaced pulses of voltage, means for selecting every $n$th one of said pulses, and a single shot multivibrator having a pair of tubes each including a plate, cathode, and grid and having plate-cathode and grid-cathode circuits, said train of pulses being supplied in one polarity to the grid-cathode circuit of one tube, said selected pulses being supplied in the opposite polarity to the grid-cathode circuit of the other tube, and said timing sequence of pulses being supplied by the plate-cathode circuit of said other tube.

2. Apparatus as defined in claim 1 in which said grid-cathode circuit of said other tube includes the series combination of a diode and a resistor connected between the grid and the cathode, said selected pulses being supplied across said resistor and said diode being so connected as to pass only pulses of said opposite polarity to the grid of said other tube.

3. Apparatus for generating a timing sequence signal for recording with a geophone output comprising a source of a train of equally time-spaced pulses of voltage, means for selecting every tenth one of said pulses, a single shot multivibrator having a pair of tubes each including a plate, cathode, and grid and having plate-cathode and grid-cathode circuits, said plate-cathode and grid-cathode circuits including a common cathode resistor connected to the cathodes of both tubes, one of said tubes having its plate capacitively coupled to the grid of the other tube, said train of pulses being supplied to the grid-cathode circuit of said one tube and said selected pulses being supplied to the grid-cathode circuit of said other tube, and illumination means supplied from the plate-cathode circuit of said other tube.

4. Apparatus for changing a first train of pulses of voltage having every $n$th pulse of different amplitude than the others into a second train of pulses of voltage having every $n$th pulse of different duration than the others which includes a single shot multivibrator having plate-cathode and grid-cathode circuits, said plate-cathode and grid-cathode circuits including a common cathode resistor connected to the cathodes of both tubes, one of said tubes having its plate capacitively coupled to the grid of the other tube, said other tube being biased on, the second train being taken from the plate-cathode circuit of said other tube, said first train being supplied to the grid-cathode circuit of said one tube to turn that tube on thereby to turn said other tube off, means for selecting every $n$th pulse of said first train and providing a negative pulse therefor, said negative pulses being supplied to the grid cathode circuit of said other tube to keep said other tube off longer than normal.

References Cited in the file of this patent

UNITED STATES PATENTS

| 2,420,516 | Bischoff | May 13, 1947 |
| 2,496,392 | Hasbrook | Feb. 7, 1950 |
| 2,518,499 | Smith | Aug. 15, 1950 |
| 2,573,150 | Lacy | Oct. 30, 1951 |
| 2,640,187 | Hasbrook | May 26, 1953 |
| 2,688,126 | Weller | Aug. 31, 1954 |
| 2,688,127 | Sargeant | Aug. 31, 1954 |
| 2,707,524 | Montgomery | May 3, 1955 |
| 2,730,699 | Gratian | Jan. 10, 1956 |
| 2,803,809 | Tilley | Aug. 20, 1957 |
| 2,836,719 | Manhart | May 27, 1958 |
| 2,863,053 | Downes | Dec. 2, 1958 |
| 2,894,128 | Wilson | July 7, 1959 |
| 2,932,547 | Swan | Apr. 12, 1960 |